United States Patent [19]

Peters

[11] 4,235,987

[45] Nov. 25, 1980

[54] METHOD FOR PRODUCING CARBORANE-SILOXANE POLYMERS DIRECTLY FROM CARBORANE

[75] Inventor: Edward N. Peters, Piscataway, N.J.

[73] Assignee: Union Carbide Corporation, New York, N.Y.

[21] Appl. No.: 36,229

[22] Filed: May 4, 1979

Related U.S. Application Data

[63] Continuation-in-part of Ser. No. 865,877, Dec. 30, 1977, abandoned.

[51] Int. Cl.$^3$ .............................................. C08G 77/04
[52] U.S. Cl. .......................................... 528/5; 528/4; 528/27; 528/30
[58] Field of Search ......................... 528/4, 5, 27, 30

[56] References Cited

U.S. PATENT DOCUMENTS

| | | | |
|---|---|---|---|
| 3,388,092 | 6/1968 | Heying et al. | 260/37 SB |
| 3,397,221 | 8/1968 | Papetti | 260/46.5 |
| 3,542,730 | 11/1970 | Papetti et al. | 260/46.5 |
| 3,661,847 | 5/1972 | Chapman | 260/46.5 |
| 3,733,298 | 5/1973 | Knollmueller | 260/46.5 |
| 4,145,504 | 3/1979 | Hedaya et al. | 528/5 |

*Primary Examiner*—Melvyn I. Marquis
*Attorney, Agent, or Firm*—William Raymond Moran

[57] ABSTRACT

A method is disclosed for preparing carborane-siloxane polymers directly from carborane which comprises reacting and polymerizing a dilithio salt of a carborane with a bis-halo-ended siloxane. This novel method offers the advantage of eliminating the expensive and time-consuming preparation of certain monomer intermediates of carborane employed in the preparation of carborane-siloxane polymers.

8 Claims, No Drawings

METHOD FOR PRODUCING CARBORANE-SILOXANE POLYMERS DIRECTLY FROM CARBORANE

This application is a continuation-in-part of U.S. application Ser. No. 865,877 entitled "Method For Producing Carborane-Siloxane Polymers Directly From Carborane" filed Dec. 30, 1977 by E. N. Peters and now abandoned.

BACKGROUND

This invention relates to a method for producing polymers; more particularly, to a method for producing carborane-siloxane polymers directly from a salt of the corresponding carborane.

Carborane-siloxane polymers are known to have excellent high temperature characteristics and to be useful in applications such as gaskets, seals, wire and cable insulation and the like where high temperature properties are desired. These polymers may be represented by a recurring unit of the following formula (I):

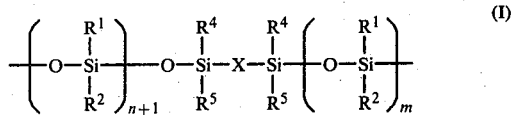

wherein $R^1$ and $R^2$, which may be the same or different, each represents hydrogen or a group containing up to 14 carbon atoms and selected from the group consisting of alkyl, alkenyl, cycloalkyl, aryl, alkaryl, aralkyl, alkoxyaryl, haloalkyl, haloaryl, cyanoalkyl, and pyridinyl; $R^4$ and $R^5$, which may be the same or different, each represents hydrogen or a group containing up to 14 carbon atoms and selected from the group consisting of alkyl, alkenyl, aryl, alkaryl, alkoxyaryl, alkoxyalkyl, haloalkyl, haloaryl and cyanoalkyl; X represents a divalent radical derived from a carborane which may be 1,7-decacarborane, 1,10-octacarborane, 1,6-octacarborane, 2,4-pentacarborane, 1,6-tetracarborane, 9-alkyl-1,7-decacarborane, 9,10-dialkyl-1,7-decacarborane, 2-alkyl-1,10-octacarborane, 8-alkyl-1,6-octacarborane, decachloro-1,7-decacarborane, octachloro-1,10-octacarborane, decafluoro-1,7-decacarborane, octafluoro-1,10-octacarborane, or mixtures thereof; and m and n individually have a value of from 0 to 4. The molecular weight of the polymers is not critical and may vary over a wide range depending on the properties desired. Generally, the elastomeric properties of these polymers improve with increasing molecular weight; however, their processability decreases at the same time. Therefore, depending on the properties and processability desired those skilled in the art will realize that polymers of varied molecular weight are possible. For example, the weight average molecular weight may vary from 5,000 to 150,000, and higher.

Commonly-assigned, U.S. Pat. No. 4,145,504 which issue Mar. 20, 1979, discloses several methods for the preparation of linear, high molecular weight polymers of the type of formula (I). Specifically, as taught therein, linear carborane-siloxane polymers may be formed by the condensation of silyl diamines or αω-diaminosiloxanes with carborane disilanols. In a second embodiment, such linear polymers are also prepared by the condensation of bis-ureido-silanes or αβ-bis-ureido-siloxanes with carborane disilanols. In a further embodiment, carborane disilanols can be condensed with silyl bis-carbamates or αω-carbamoylsiloxanes to form such carborane-siloxane polymers. Illustrative of all of the R groups as hereinbefore de defined are such groups as methyl, ethyl, n-propyl, n-butyl, n-pentyl, n-hexyl, n-butenyl, n-hexenyl, cyclopentyl, cyclohexyl, phenyl, benzyl, o-,m-, or p-chlorophenyl, o-,m- or p-methylphenyl, o-,m-, or p-methoxyphenyl, 3,3,3-trifluoropropyl, cyanomethyl, morpholinyl, pyridinyl and the like. The R groups need not be the same in any one polymeric chain. Particularly preferred are groups containing up to 7 carbon atoms. The carborane disilanols employed in these processes represented by formula (III), may be prepared as shown in equations (1)-(3):

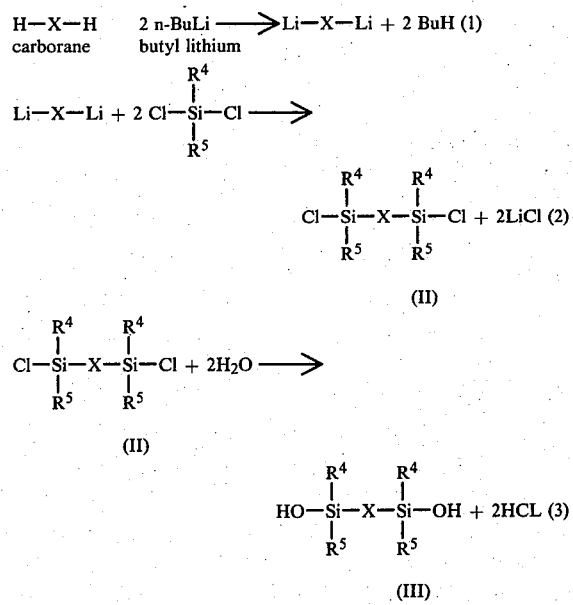

wherein X, $R^4$ and $R^5$ are as previously indicated.

The preparation of the carborane disilanol (III) is expensive and time-consuming, as is, to a lesser extent, the preparation of the bis-ureido-silanes and bis-ureido-siloxanes, and other monomers employed in the synthesis of these polymers. The novel method of the invention eliminates these disadvantages and enables one to prepare carborane-siloxane polymers employing materials which are all commercially available and/or readily accessible.

In U.S. Pat. No. 3,397,221 there is disclosed a process for the preparation of organosiloxane-containing carborane monomers which are prepared via a dialkyl metal derivative of carborane and a dihalogen organosiloxane in a stoichiometric-ratio of 2 to 1 or greater. The monomers after separation and purification can then be reacted with dialkoxy silanes in the presence of ferric chloride to form linear polymeric products. In contrast, the process of this invention provides a direct route to the desired polymers without the need for preparing an isolating organosiloxane-containing carborane monomers.

SUMMARY OF THE INVENTION

The present invention is a method for preparing carborane-siloxane polymers directly from the carborane, which comprises reacting and polymerizing a dilithio salt of a carborane with a bis-halo-ended siloxane to afford the polymer. This method offers significant advantages compared to known methods.

DETAILED DESCRIPTION

Broadly, the present invention is a method for preparing carborane-siloxane polymers (VI) by reacting and polymerizing a dilithio salt (IV) and a siloxane (V):

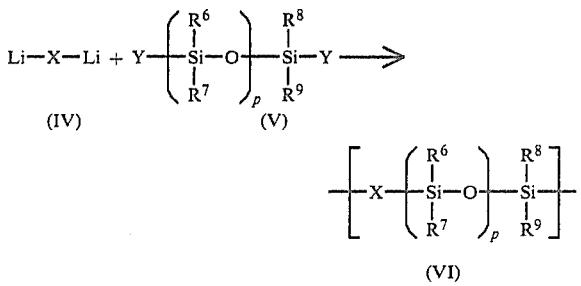

(IV)  (V)

$$\left[ -X-\left( \begin{matrix} R^6 \\ | \\ Si-O \\ | \\ R^7 \end{matrix} \right)_p \begin{matrix} R^8 \\ | \\ Si- \\ | \\ R^9 \end{matrix} \right]$$

(VI)

wherein X is as previously indicated; Y is a relatively labile moiety which is a weak nucleophile with lithium; p is a positive integer of 1 to 4; and $R^6$, $R^7$, $R^8$ and $R^9$, which may be the same or different, each represent a hydrogen atom or a group containing up to about 14 carbon atoms and selected from the group consisting of alkyl, aryl, alkenyl, alkaryl, aralkyl, haloalkyl, haloaryl, and the like.

Illustrative $R^6$-$R^9$ groups as hereinbefore defined are such groups as methyl, ethyl, n-propyl, n-butyl, n-pentyl, n-hexyl, n-butenyl, n-hexenyl, phenyl, benzyl, o-, m-, or p-chlorophenyl, o-, m- or p-methylphenyl, 3,3,3-trifluoropropyl, and the like. These R groups need not be the same in any one polymeric claim. Particularly preferred are groups containing up to 7 carbon atoms.

X is preferably derived from meta-decacarborane, $C_2B_{10}H_{12}$, since this meta-isomer is especially useful in the applications discussed hereinabove.

Y is generally a leaving group which forms a weak nucleophile with lithium, preferably a halogen atom, such as chlorine or bromine, or an acetyl group, and is most preferably, chlorine. These materials of formula (V) are commercially available and methods for preparing these monomers are known in the art. As stated above, Y is a relatively labile moiety selected such that a strong nucleophile is not formed with lithium, which might attack the siloxane linkages or the carboranyl carbon-silicon linkages in the polymer backbone. With this limitation, any moiety capable of forming compound (V) and inert to the side reactions can be employed, although chlorine is the most preferred.

The R groups $R^6$-$R^9$ are preferably all alkyl of up to 7 carbon atoms; or one of $R^6$ and $R^7$ is alkyl, such as methyl, and the other is aryl, such as phenyl, and $R^8$ and $R^9$ are each alkyl, such as methyl.

The dilithio salt (IV) may be prepared by methods known in the art; for example, meta-carborane, $C_2B_{10}H_{12}$, is reacted under mild conditions with twice the molar amount of n-butyl lithium to form the dilithio salt of meta-carborane. Instead of the n-butyl salt, any alkyl, aryl, alkaryl, aralkyl or cycloalkyl salt can be employed which has up to 14, preferably at least 4, carbon atoms, although the n-butyl salt is the most preferred.

The reaction conditions of the method of the present invention are not especially critical and generally, the reaction is conducted under mild conditions for moderate periods of time. The temperature of reaction may vary from about 0° to about 35° C. and the reaction may be conducted at atmospheric pressure. If a solvent is necessary, an inert organic solvent not reactive with the lithium salts can be employed, such as n-hexane, benzene, toluene, diethyl ether and the like. There are no specific apparatus requirements, and any conventional type of apparatus can be employed in the practice of the invention.

The reactants are employed in approximately stoichiometrically-equivalent proportions. The yield to be expected would increase with the molecular weight of the polymer and in this connection, the temperature, time of reaction and particular reactants employed among other factors, would control the molecular weight of the product. The time of reaction is not critical and may be on the order of 6 to 12 hours. It is not intended to limit the scope of the present invention to these reaction conditions. Generally, the reactants employed in the process of the present invention readily react with one another under mild conditions in conventional solvents. Those skilled in the art are capable of practicing the present invention using the foregoing guidelines.

The resulting polymer can be recovered and purified by methods known in the art, such as that described in U.S. Pat. No. 4,145,504 mentioned hereinbefore.

EXAMPLE

A dry 100 ml. 3 neck flask was equipped with a mechanical stirrer, a nitrogen inlet and an addition funnel, meta-Carborane (1.13 gr., 0.0078347 moles) and 20 ml. of anhydrous ether were placed in the reaction vessel. The reaction mixture was cooled in an ice bath and a solution of n-butyl lithium (0.0157 moles) was added dropwise over a period of one hour. After completion of the addition, the cooling bath was removed and the reaction mixture was stirred for 3 hours at room temperature.

The reaction mixture was cooled to $-10°$ C. $\pm 5°$ and a solution of 1,5-dichlorohexamethyltrisiloxane (1.78 gms., 0.007835 moles) in 10 ml. of dry ether was added dropwise over a period of two hours. The reaction mixture was stirred at $-10°$ C. for one hour, 0° C. for one hour, and at room temperature for four hours. The solution was filtered and the resulting polymer was precipitated from methanol (60% isolated yield).

Characterization by gel permeation chromatography indicated a molecular weight (weight average) of 6486.

The invention as described hereinbefore is not to be limited except as set forth in the following claims.

What is claimed is:

1. A method for preparing carboranesiloxane polymers having the following recurring unit:

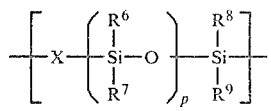

by reacting and polymerizing in equivalent molar proportions a dilithio salt of a carborane:

with a siloxane of the formula:

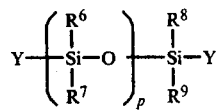

wherein X represents a divalent radical derived from a carborane, Y represents a relatively labile moiety which forms a weak nucleophile with lithium; $R^6$, $R^7$, $R^8$ and $R^9$, which may be the same or different, each represents a hydrogen atom or a group containing up to 14 carbon atoms and selected from the group consisting of alkyl, aryl, alkenyl, alkaryl, aralkyl, haloalkyl and haloaryl; and p is a positive integer of 1 to 4.

2. A method according to claim 1, wherein Y is a halogen atom or an acetyl group.

3. A method according to claim 1, wherein Y is a chlorine atom.

4. A method according to claim 1, wherein said carborane is meta-decacarborane.

5. A method according to claim 1, wherein said $R^6$, $R^7$, $R^8$ and $R^9$ are each alkyl of up to 7 carbon atoms.

6. A method according to claim 5, wherein each of said $R^6$, $R^7$, $R^8$ and $R^9$ is methyl.

7. A method according to claim 1, wherein one of said $R^6$ and $R^7$ is alkyl and the other is aryl, and said $R^8$ and $R^9$ are each alkyl.

8. A method according to claim 7, wherein one of said $R^6$ and $R^7$ is methyl and the other is phenyl, and wherein said $R^8$ and $R^9$ are each methyl.

* * * * *